No. 687,560. Patented Nov. 26, 1901.
W. K. FREEMAN.
VEHICLE TIRE.
(Application filed Oct. 7, 1901.)
(No Model.)
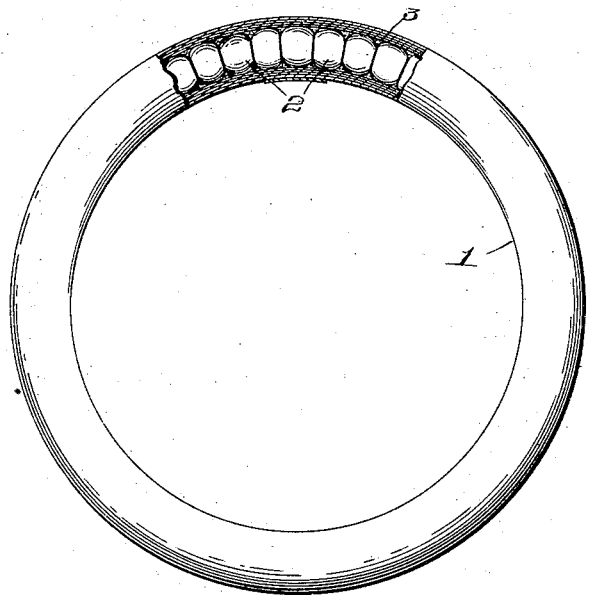
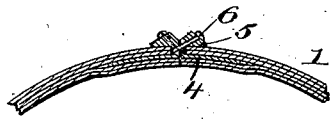
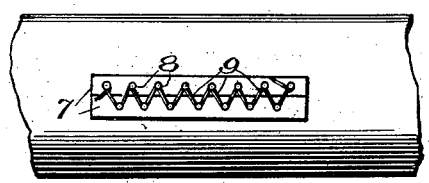
Witnesses:
Inventor:
Walter K. Freeman

UNITED STATES PATENT OFFICE.

WALTER K. FREEMAN, OF NEW YORK, N. Y.

VEHICLE-TIRE.

SPECIFICATION forming part of Letters Patent No. 687,560, dated November 26, 1901.

Application filed October 7, 1901. Serial No. 77,888. (No model.)

*To all whom it may concern:*

Be it known that I, WALTER K. FREEMAN, of New York, in the county of New York and State of New York, have invented certain new and useful Improvements in Vehicle-Tires; and I do hereby declare the following to be a full, clear, and exact description of the same, reference being had to the accompanying drawings, forming a part of this specification, and to the figures of reference marked thereon.

This invention relates to tires for vehicles, and has for its object the production of a tire having a high degree of resiliency coupled with good wearing qualities and wherein the tension in the tire is well distributed, but without possessing the infirmities incident to the employment of air under compression within the tire.

To secure the desired objects, a tubular tire is employed having the tread or wearing portion as well as the sides and rim portions of any usual construction, preferably, however, of a construction well calculated to stand wear and at the same time possess that flexibility found most efficient and desirable in pneumatic-tire construction. The interior surface of the tire is preferably smooth, and the cavity or chamber is filled with resilient balls, which are pressed tightly together, and thereby caused to assume a more or less oval form in cross-section in one plane, the circular contour in a plane transversely of the tire being maintained by the walls of the tire. The use of balls alone, it is found, does not produce the results desired; but if a dry lubricant, such as graphite, be closely packed in the interstices and between and around the balls it is found that pressure at one point is distributed with great uniformity and the elasticity of the whole circle of balls is made available. The dry lubricant not only permits the balls to move without wear, but may support those portions of the tire between the balls and is in no danger of escaping through small punctures or the opening through which the balls are inserted, as would be the case were a liquid of viscous substance employed.

In the accompanying drawings, Figure 1 is an elevation of a tire, partially in section, illustrating the present invention. Fig. 2 is a detail section through the tire at the opening through which the balls and graphite are inserted. Fig. 3 is a detail of a modified arrangement of closure for the filling-opening.

Similar numerals in the several figures indicate like parts.

The tire proper or sheath is indicated by the numeral 1, and it will be understood that in form and construction it may be similar to the ordinary single-tube pneumatic tires having a smooth interior surface, and care should be taken to see that the chamber is as nearly cylindrical as possible in cross-section. Within the sheath a series of elastic but solid balls 2 are placed, such balls being preferably of a diameter equal to the diameter of the chamber in cross-section, and the number of balls or the pressure exerted in inserting them determines the tension of the tire. In every instance, however, the balls are pressed together and assume somewhat the form illustrated in Fig. 1. The spaces around the balls are filled with dry graphite, as indicated at 3, such graphite being inserted with or between each of the balls, thereby insuring an even distribution and effective lubricating action on each ball. In practice it is found that the tendency to wear occurs mainly between the balls; but the dry graphite effectually prevents appreciable wear at any point, besides aiding in distributing the strains from the point of pressure (as the point where the wheel rests on the ground) throughout the tire. With this arrangement the balls flow or move freely, and hence the elasticity of the whole circle of balls is utilized and the effect cannot be distinguished from the effect secured with a well-inflated pneumatic tire of approved construction. The balls are preferably inserted by an apparatus designed for the purpose, but which forms no part of the present application, the insertion taking place through an opening located on the inner side of the sheath.

In the preferred construction the slit forming the opening is provided with metal edges and the edges are drawn closely together, so as to prevent the escape of any of the lubricant. Thus in Fig. 2 it will be seen that metal edges or binders 4 are formed in the tire and screws 6 are employed for drawing the edges together. The screws are usually inserted diagonally, as shown, and inclined projections 5 are provided to afford firm seats for the heads. Obviously such edges may be drawn together by other means. Thus in Fig. 3 the metal edges 7 are provided with studs or other lacing-engaging means 8, and lacing 9 is passed back and forth and tautened to secure the desired result. The filling-opening is preferably next the rim of the wheel and is entirely concealed thereby. Thus in practice the tire presents no unusual appearance.

Having thus described my invention, what I claim as new, and desire to secure by Letters Patent, is—

1. A resilient tire for vehicles embodying a flexible sheath having a smooth interior surface, a series of independent elastic balls confined within the sheath and under tension between themselves and a dry comminuted lubricant surrounding the balls and filling the interstices between the same; substantially as described.

2. A resilient tire for vehicles embodying a flexible sheath having a smooth interior surface, a series of independent elastic balls confined within the sheath and under tension between themselves and dry comminuted graphite lubricant surrounding the balls and filling the interstices between the same; substantially as described.

3. A resilient tire for vehicles embodying a flexible sheath having a filling-opening on the inner side, metal edges incorporated in the tire along the edges of said opening and screws uniting said edges for closing the filling-opening; substantially as described.

WALTER K. FREEMAN.

Witnesses:
ALEXANDER S. STEWART,
ELIZABETH GRIFFITH.